(12) United States Patent
Singer (10) Patent No.: US 8,123,154 B2
(45) Date of Patent: Feb. 28, 2012

(54) SEAT BELT RETRACTOR WITH A BELT EXTENSION CONTROLLED FORCE LIMITING

(75) Inventor: Klaus-Peter Singer, Hamburg (DE)

(73) Assignee: Autoliv Development AB, Vargarda (SE)

( * ) Notice: Subject to any disclaimer, the term of this patent is extended or adjusted under 35 U.S.C. 154(b) by 692 days.

(21) Appl. No.: 12/097,412

(22) PCT Filed: Nov. 25, 2006

(86) PCT No.: PCT/EP2006/011315
§ 371 (c)(1),
(2), (4) Date: Jun. 13, 2008

(87) PCT Pub. No.: WO2007/073815
PCT Pub. Date: Jul. 5, 2007

(65) Prior Publication Data
US 2008/0315025 A1 Dec. 25, 2008

(30) Foreign Application Priority Data
Dec. 19, 2005 (DE) .......................... 10 2005 061 025

(51) Int. Cl.
*B60R 22/28* (2006.01)
*B60R 22/36* (2006.01)

(52) U.S. Cl. ................................. 242/379.1; 242/384.2

(58) Field of Classification Search ............... 242/379.1, 242/383.1, 384.1, 384.2; 280/805, 806, 807; 297/470–472, 475–478
See application file for complete search history.

(56) References Cited

U.S. PATENT DOCUMENTS 4,029,267 A * 6/1977 Slipper ...................... 242/384.2
5,607,118 A 3/1997 Dybro et al.
(Continued)

FOREIGN PATENT DOCUMENTS
DE 4132876 4/1993
(Continued)

*Primary Examiner* — Michael Mansen
*Assistant Examiner* — Scott Haugland
(74) *Attorney, Agent, or Firm* — Brinks Hofer Gilson & Lione (57) ABSTRACT

A seat belt retractor for motor vehicles with a vehicle-sensitive or belt webbing sensitive controllable locking device, or both, for the belt shaft, having a profiled head that acts as a support for a displaceably mounted locking member that locks the belt shaft in the housing, and a two-stage force limiting device having two force limiting elements that are switchable between a high level and a low level of force limitation via an interposed coupling (19, 20) that is controlled by means of a control device having a countergear which determines an amount of belt webbing that is extended from the belt shaft.

15 Claims, 8 Drawing Sheets

U.S. PATENT DOCUMENTS

| | | | |
|---|---|---|---|
| 6,250,579 B1 * | 6/2001 | Bannert et al. | 242/379.1 |
| 2002/0017583 A1 * | 2/2002 | Yano et al. | 242/379.1 |
| 2003/0019969 A1 * | 1/2003 | Webber et al. | 242/379.1 |
| 2003/0132334 A1 * | 7/2003 | Koning et al. | 242/382 |
| 2003/0201357 A1 * | 10/2003 | Koning et al. | 242/379.1 |
| 2003/0230661 A1 * | 12/2003 | Bell et al. | 242/374 |
| 2004/0124625 A1 * | 7/2004 | Bae | 280/807 |
| 2004/0188995 A1 * | 9/2004 | Clute | 280/806 |
| 2005/0284978 A1 | 12/2005 | Zolkower | |

FOREIGN PATENT DOCUMENTS

| | | |
|---|---|---|
| DE | 200 15 402 U1 | 1/2001 |
| EP | 0913300 A1 | 5/1999 |
| WO | WO 2007/073815 | 7/2007 |

\* cited by examiner

SEAT BELT RETRACTOR WITH A BELT EXTENSION CONTROLLED FORCE LIMITING

CROSS REFERENCE TO RELATED APPLICATIONS

This application claims priority to German patent application number DE 10 2005 061 025.0 filed Dec. 19, 2005, and PCT/EP2006/011315, filed Nov. 25, 2006, the entire disclosure of which is incorporated by reference herein.

FIELD OF THE INVENTION

The present invention relates to a seat belt retractor for motor vehicles, comprising a vehicle-sensitive and/or belt webbing-sensitive controllable locking device for the belt shaft, with the retractor comprising a profiled head that acts as a support for a displaceably mounted locking member that locks the belt shaft in the housing, and a two-stage force limiting device that is equipped with two force limiting elements connected in series, the force limiting elements being switchable between a high level and a low level of force limitation via an interposed coupling that is controlled by means of a control device.

BACKGROUND OF THE INVENTION

A seat belt retractor having the above-mentioned characteristics is described in DE 200 15 402 U1. In addition to a torsion bar disposed between the belt shaft and the profiled head thereof, this seat belt retractor has two further force limiting devices connected in series in the form of two friction couplings, which are coupled to one another via an externally and internally toothed ring. The first friction coupling having a high level of force limitation acts between the belt shaft and/or the profiled head thereof and the toothed ring, and the second friction coupling between the toothed ring and the housing. In the initial state, the toothed ring is fixed to the housing via a catch that can be controlled by a control device, wherein, if necessary, the catch is controlled disengaged from the toothed ring by the control device such that the toothed ring can be rotated freely in relation to the belt retractor housing.

In the known belt retractor, the control of the force limiting elements is configured such that the toothed ring is fixed to the housing via the catch so that the higher level of force limitation acts first in case of an accident. If a signal emitted by the vehicle determines that based on the driver's height, weight or position, or based on the severity of the accident, the restraining force acting on the occupants is becoming too large, the catch is controlled disengaged from the toothed ring so that the toothed ring can be rotated freely in relation to the housing. Thus, a relative movement occurs between the housing and the toothed ring, wherein the second friction coupling located between the housing and the toothed ring acts as a force limiting device with a lower level of force limitation. Accordingly, the switching operation is accomplished from the high level of force limitation to the lower level of force limitation and is not reversible. Insofar, the known belt retractor has the disadvantage that the high level of force limitation acts first also on lower-weight or buckled-up persons, resulting in an accordingly strong increase in the restraining force. The level of force limitation is only reduced when the restraining force is too high. A further disadvantage is that the known seat belt retractor does permit consideration of the momentary changes in the sitting position by movements of the buckled-up occupants on the seat.

SUMMARY OF THE INVENTION

Therefore, the object of the present invention is to further develop a seat belt retractor of the general type such that the level of force limitation may be more flexibly and better adjusted to the occupants' conditions.

The solution of this task, including advantageous embodiments and refinements of the present invention, will become apparent from the claims appended to this description.

The present invention provides a control device for switching the coupling between the high level and low level of force limitation comprising a counter gear, which determines the amount of the respective belt webbing that is extended from the belt shaft, and that the coupling can be reversibly switched back and forth between the high and the low levels of force limitation.

The present invention has the advantage that, depending on the belt webbing extension at the moment of the accident, the level of force limitation is either adjusted to a high level or to a low level right from the start. Thus, not only is the belt webbing extension contingent upon the body measurements and respective clothing, but also the occupants' sitting position at the moment of the accident may be taken into consideration. If a small and therefore normally light-weight occupant, for whom a low level of force limitation is to be engaged according to prior art, bends forward shortly before the accident, the occupant will possibly be correspondingly near a vehicle part so that the longer belt webbing release path associated with the low level of force limitation may already endanger the occupant. However, in this case the seat belt retractor according to the present invention ensures that the high level of force limitation is immediately engaged via a belt webbing extension request, wherein, while accepting a higher belt webbing force, a potential forward displacement of the occupant is reduced. Therefore, the small occupant is better protected.

Further, the protection is advantageously improved for such persons, who are buckled-up with a belt webbing extension located shortly before the switching point, and for whom the low level of force limitation is adjusted in this regard. In case of an accident, the activation of the force limiting element having the low level of force limitation will cause a belt webbing extension, at which the switching position may be exceeded and the high level of force limitation be consequently engaged.

According to one embodiment of the present invention, the coupling comprises a toothed ring, which is rotatably mounted on the housing of the belt extractor and when locked can be engaged by the locking member of the profiled head, and a catch, which can be displaced back and forth between two switching positions by means of the control device, said catch releasing the toothed ring in the one switching position and locking it to the housing in the other switching position. As far as the use of a toothed ring for accomplishing the switching connection between two force limiting devices is known from DE 200 15 402 U1, a movement of the corresponding catch is only provided in one switching direction.

In a further embodiment, the force limiting elements are disposed with respect to the toothed ring such that the first force limiting stage having the low level of force limitation is implemented by a toothed ring that can rotate in relation to the housing, and the second force limiting stage having the high level of force limitation is implemented by the catch, which is controlled by the control device when engaged in the toothed ring, in the toothed ring that is fixed to the housing.

In a further embodiment of the present invention, the force limiting element defining the low level of force limitation is a torsion rod, which is disposed in the belt retractor housing outside the belt shaft, one end of the rod being fixed inside the housing and the other end being attached to the toothed ring by means of a connecting means such that the rotation of the toothed ring can be translated into a twisting motion of the torsion rod. EP091330041 describes a torsion rod disposed outside the belt shaft as a second force limiting element, which is connected directly to the belt shaft by means of a gear mechanism and thus rotates together with the belt shaft. In the event of an appropriate load case, the second torsion rod is locked so that a force limiting effect is added to the level of force limitation created by the first torsion rod disposed on the belt shaft. In contrast, according to the present invention, the torsion rod located outside the belt shaft is uncoupled from the second force limiting element, which likewise has the shape of a torsion rod disposed in the belt shaft, for example, by means of the rotatable toothed ring.

In a further embodiment of the present invention, the connecting means is made of a metal band having a predetermined length, one end of which is attached to the toothed ring and the other end of which is wound onto and attached to a winding spool, which is fixed to the torsion rod and rotatably disposed on the belt retractor housing. This is advantageous in that also at the low level of force limitation, the belt webbing release associated with the twisting motion of the torsion rod is limited to the length of the metal band to be unwound. If the metal band is completely unwound, the force is directly transmitted from the toothed ring to the twisted torsion rod, and consequently to the housing, such that a rigid system is created, which activates the higher level of force limitation of the further force limiting element even with a selected catch and a rotatable toothed ring. In this way, additional safety is provided for persons, for whom the control device only provides the low level of force limitation.

Regarding the design of the force limiting element defining the lower level of force limitation, an alternative embodiment provides that the force limiting element defining the low level of force limitation is a bending brake that is disposed on the belt retractor housing outside the belt shaft and comprises a pulling element, which is guided through a baffle fixed to the housing, and has one end attached to the toothed ring such that the rotation of the toothed ring can be translated by the baffle into an energy-absorbing pull-through of the pulling element. This has the advantage that the arrangement of a bending brake as an additional force limiting element is cost-effective. In this respect, the effectiveness of the force limitation may be easily adjusted via the length of the pulling element that is to be pulled through the baffle, which is to say the retained reserve thereof.

In this connection, different embodiments of the present invention provide that the free end, which forms the reserve, of the pulling element is disposed outside around the toothed ring, or that the free end, which forms the reserve, of the pulling element is disposed in a storage housing, which is rotatably mounted on the belt retractor housing, and may be pulled out of the storage housing.

The force path may advantageously be adjusted during force limitation by the selection of the width of the pulling element in that the pulling element has a uniform width across the length thereof, or in that the width of the pulling element varies across the length thereof as a function of the desired change in the level of force limitation.

In a further embodiment of the present invention, the counter gear comprises an externally toothed gear wheel that is connected to the belt shaft, a further externally toothed gear wheel that is fixed to the housing, and a third externally toothed gear wheel disposed on a rocker arm, which is pivotably mounted on the housing in two switching positions, wherein all three gear wheels mesh with one another, and switching points for the switching lugs that fix the rocker arm are disposed on the gear wheels, wherein in the predetermined unwinding state the lugs come in contact with one another and thus pivot the rocker arm between the switching positions. A counter gear of this type is known in principle from DE 41 32 876, namely as a retractor switch for the use of a seat belt retractor in a child seat. The counter gear switches the belt webbing-sensitive and/or vehicle-sensitive control system for locking the belt shaft when the retractor is used with a child seat. The known counter gear comprises two gear wheels with corresponding switching lugs that are disposed on a rocker arm, wherein the wheels mesh with the gear wheel that is connected to the belt shaft. As a result of the arrangement of the switching lugs on the individual gear wheels, the belt webbing must first be fully unwound from the belt shaft before a switching operation is possible, so that during a return motion of the belt webbing to an extended position that is suitable for the use of a child seat, the corresponding vehicle-based control system is switched off. The further return motion of the belt webbing up to the storage position then results in a new switching operation by engaging the belt webbing-sensitive and vehicle-sensitive control system.

A further embodiment of the present invention provides that the gear wheel connected to the belt shaft and the gear wheel mounted on the housing each comprise a switching lug, and that the gear wheel mounted on the rocker arm comprises two switching lugs to restrict the switching hysteresis. Thus, each of the two switching lugs disposed on the gear wheel mounted on the rocker arm interact with the switching lugs of the gear wheel fixed on the shaft and/or with the switching lugs of the gear wheel mounted on the housing such that both switching points may be adjusted via a very small angle of rotation of the belt shaft. In this way, the exact definition of the switching point for controlling the catch in the toothed ring is a function of the extension motion and also the winding motion of the belt webbing.

To the extent that the rocker arm controlled by the counter gear must control the catch in both of the switching positions, alternative embodiments of the present invention provide that the rocker arm directly controls the catch via a mechanical connection or indirectly via an interposed electrical or pneumatic switch.

In case of a direct mechanical control, an embodiment of the present invention provides that a control catch is disposed on the catch relatively displaceably thereto and interacting with the rocker arm, the control catch having a control cog that interacts with the outer gearing of the toothed ring. Such an embodiment ensures that via the engagement of the control catch, the catch is engaged in the outer gearing of the rotating toothed ring with precise fit without resulting in tooth-on-tooth locking. This applies not only to the switching operation for the belt extension when buckling up, or when the buckled-up person moves, but also to switching the level of force limitation, for example, when switching occurs due to the engagement of the catch in the outer gearing of the toothed ring as a result of the belt webbing extension related to the forward displacement of an occupant exposed in the first instance to the low level of force limitation.

A further embodiment of the present invention provides that the catch has a slotted mounting recess for the U-shaped control catch, with which the connecting member of said catch is inserted in the mounting recess allowing clearance for movement. With respect to the reversible configuration of the coupling, it may be provided that with regard to the retraction of the catch, said catch is pretensioned in the release position for the toothed ring by means of a spring.

A further embodiment of the present invention provides that the control catch is tensioned by a pretensioned spring in the direction of the engagement in the outer gearing of the toothed ring, and that the pretensioned spring is fixed in the release position of the control catch for the toothed ring by means of a separately controlled holding device, which releases the pretensioned spring when the control catch engages in the outer gearing of the toothed ring. This is advantageous in that in case of the dynamic engagement of the control catch in the outer gearing of the toothed ring at the beginning of the rotation of the toothed ring, the switching force of the control catch is increased by releasing the pretensioned spring. As a result of the increased actuating force accomplished in this way, as well as the subsequent meshing force of the control catch in the external gearing of the toothed ring, it is no longer possible to switch off the adjusted higher level of force limitation due to the locking of the toothed ring on the one hand, and on the other hand, as a result of the pretensioning by the spring, the control catch in addition acts as a retraction lock against undesired reversed rotation of the toothed ring.

In this connection, it may be advantageous that the holding device comprises a gate that may be displaced relative to the pretensioned spring between a holding position and a release position. For this purpose, an embodiment of the present invention provides that the gate is maintained in the holding position by means of a holding lever, which rests positively in a recess configured in the toothed ring and is released from the toothed ring on rotation of said toothed ring. Coupling the holding device to the rotation of the toothed ring ensures that no faulty activation and/or faulty operation occur because the release of the holding device is exclusively activated by the onsetting rotation of the toothed ring, wherein the toothed ring is then fixed by the immediately operative, load absorbing catch.

Insofar as an embodiment of the present invention provides that the pretensioned spring is disposed and oriented such that, in the release position of the control catch for the toothed ring, the spring force line extends via the pivot bearing of the control catch on the catch and, when the control catch is pivoted, the buckling thereof produces a torque in the engagement direction of the control catch in the toothed ring, this has the advantage that in the resting position of the pretensioned spring, no additional torque is present that would have to be absorbed by the holding device. Only when the control catch is pivoted will the intended torque become active.

BRIEF DESCRIPTION OF THE DRAWINGS

The drawings show exemplary embodiments of the present invention, which are described in more detail below: The drawings show:

FIG. 1 an overall view of a seat belt retractor in accordance with the present invention, FIG. 2 the subject matter of FIG. 1 from a different angle, FIG. 3 an exploded view diagram of the subject matter according to FIGS. 1 and 2, FIG. 4 a top view of the control device configured as a counter gear in one of the switching positions of the rocker arm, FIG. 5 the subject matter of FIG. 4 in the other switching position of the rocker arm, FIG. 6 a detailed drawing of the toothed ring with the torsion rod having the lower level of force limitation connected thereto, FIG. 7 an enlarged cut-out view of the catch with the associated control catch and toothed ring, FIG. 8 an overall view of the catch with the control catch mounted thereto, FIG. 9 the subject matter of FIG. 8 with a separate illustration of the catch and control catch, FIGS. 10a-c the process of engaging the catch into the outer gearing of the toothed ring, FIG. 11a-c the control catch with a pretensioned spring acting on it and the associated holding, device for the pretensioned spring in the different functional positions of the control catch, FIG. 12 a side view of the toothed ring with the torsion rod having the lower level of force limitation connected thereto in the initial position, FIG. 13 the subject matter of FIG. 12 with an unwound metal band, FIG. 14 a side view of the toothed ring with a force limiting device configured as a bending brake having the lower level of force limitation, FIG. 15 a modified embodiment of the subject matter of FIG. 14.

DETAILED DESCRIPTION OF THE INVENTION

Figure 1:
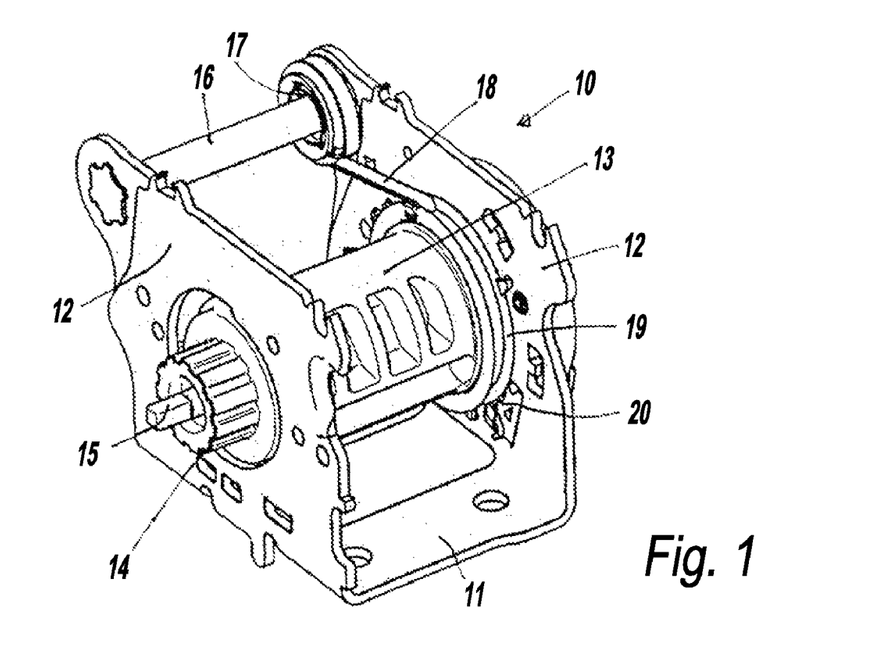
Figure 2:
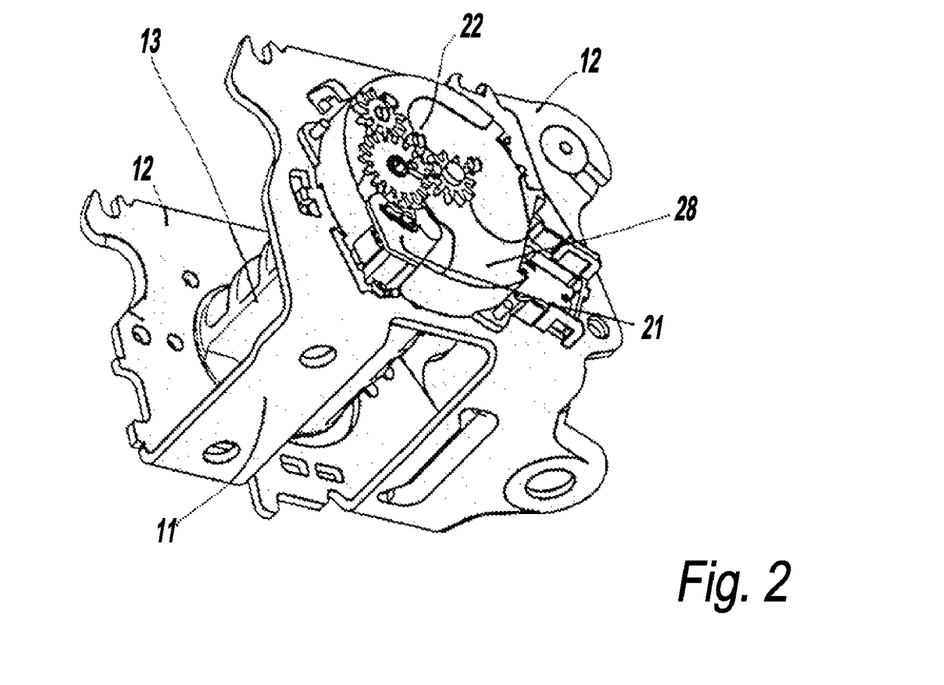

The seat belt retractor 10 illustrated in FIGS. 1 and 2 has a U-shaped housing 11 with lateral housing legs 12 in which a belt shaft 13 is mounted. The so-called spring side of the belt shaft is designated with numeral 14, wherein a spring housing that is not illustrated may be disposed thereon for the winding up motion of the belt shaft, and also other functional elements, such as a tightening device, for example. Reference numeral 15 designates the end of a torsion rod disposed in the belt shaft 13, said torsion bar forming the force limiting element having the high level of force limitation.

A second force limiting element having a level of force limitation that is lower in relation to the torsion rod 15 is provided as a second torsion rod 16 that is disposed outside the belt shaft 13, the one end of said torsion rod being fixed in a positive locking manner on the associated housing leg 12 of the seat belt retractor housing 11, and the other end being connected non-rotatably to a winding spool 17 rotatably mounted on the opposite housing leg 12. A metal band 18 is wound onto the winding spool 17 and attached with the free end thereof to a toothed ring 19 that is mounted rotatably on the respective housing leg 12. As is apparent from other drawings in the figure, the toothed ring 19 is provided with an outer gearing, which is associated with a force-transmitting catch 20 mounted on the housing leg 12.

As is apparent from FIG. 2, a bearing plate 28 is disposed on the outside of the housing leg 12 supporting the toothed ring 19, said bearing plate having a counter gear 22 with a gear wheel 23 that is connected to the associated end of the belt shaft 13, a gear wheel 24 mounted on the bearing plate 28 and a gear wheel 24 disposed on a rocker arm 25 mounted pivotably on the bearing plate 28. The rocker arm 21 extends beneath the bearing plate 28 by means of an extension and interacts with the catch 20 in a manner described below.

Figure 3:
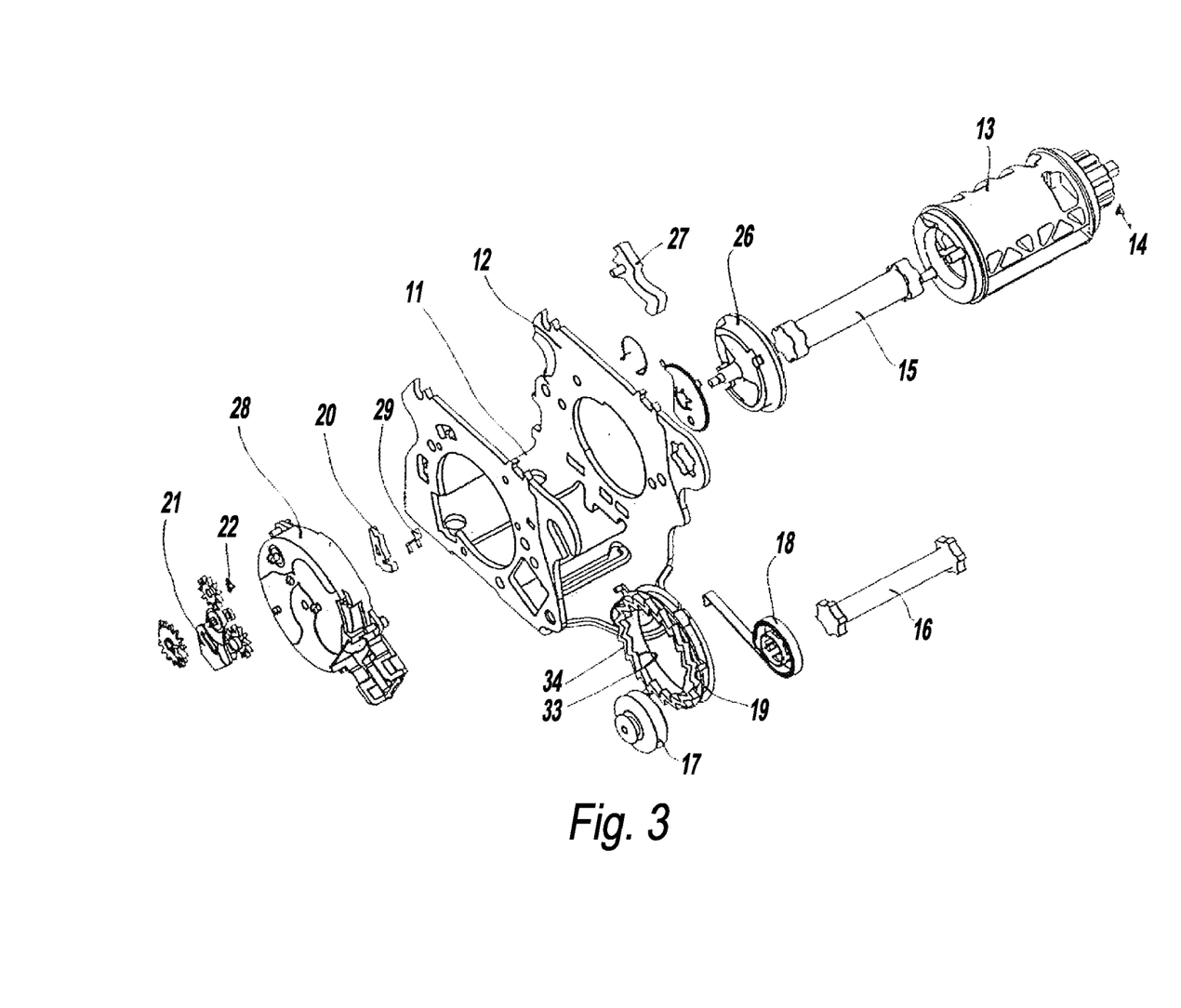

FIG. 3 shows the above-described individual components of the seat belt retractor 10 in detail again, wherein it is apparent that a profiled head 26 is disposed at the end of the belt shaft 13; which engages in the bearing plate 28, and is fixed to the torsion rod 15 extending inside the belt shaft 13, an inertia controlled locking member 27 being disposed on the profiled head 26, wherein the member may be engagable in the inner gearing 33 configured on the toothed ring 19. In contrast, the catch 20 is configured for engagement in the outer gearing 34 of the toothed ring 19.

Figure 4:
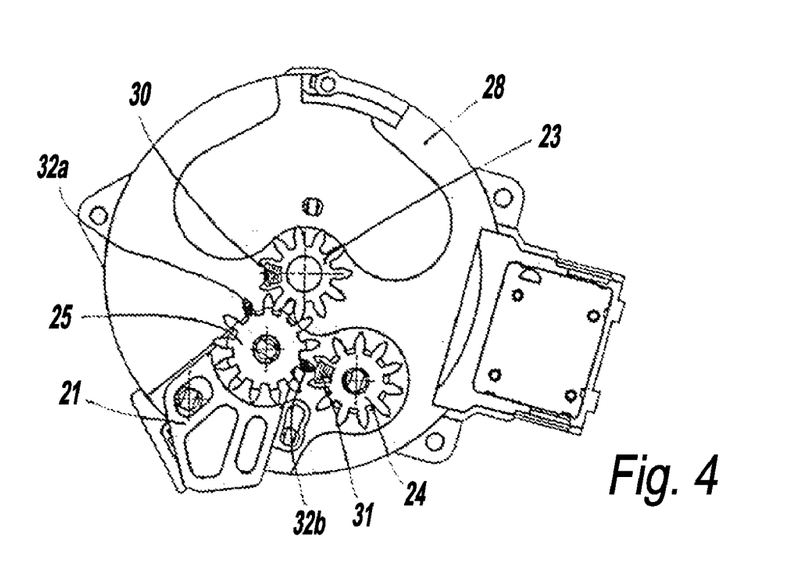
Figure 5:
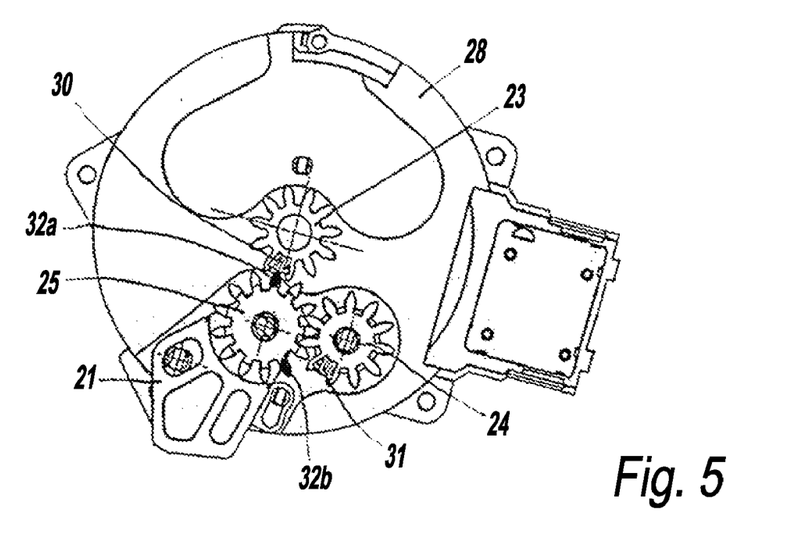

As is further apparent from FIGS. 4 and 5 in an enlarged illustration of the counter gear 22, the gear wheels 23, 24, 25 are disposed in relation to one another such that the gear wheel 25 mounted on the rocker arm 21 remains meshed with the shaft gear wheel 23 in each of the two possible switching positions of the rocker arm 21 on the one hand, and with the gear wheel 24 mounted on the bearing plate 28, on the other hand. Switching lugs 30 and/or 31 are configured on each of the two gear wheels 23 and 24. In contrast, two switching lugs 32a, b are disposed offset from one another at an angle of rotation on the gear wheel 25 mounted on the rocker arm 21, the switching lug 32a meeting with the switching lug 30 of the shaft gear wheel 23 when the counter gear 22 is in the appropriate position (FIG. 5), while the switching lug 32b meets with the switching lug 31 of the gear wheel 24 mounted on the bearing plate when the rocker arm 21 is in a different position. When comparing FIGS. 4 and 5, it is apparent that upon contact of the two switching lug combinations, the rocker arm 21 is respectively pivoted according to the two switching positions. Based on the two switching lugs 32a, b located on the gear wheel 25 disposed on the rocker arm 21, the corresponding switching point may be defined with a very small clearance of the angle of rotation, so that not only an exactly reproducible switching point in the unwinding direction as well as in the winding direction is created, but also both switching points are closely adjacent to one another in relation to the angle of rotation of the belt shaft 13.

Figure 6:
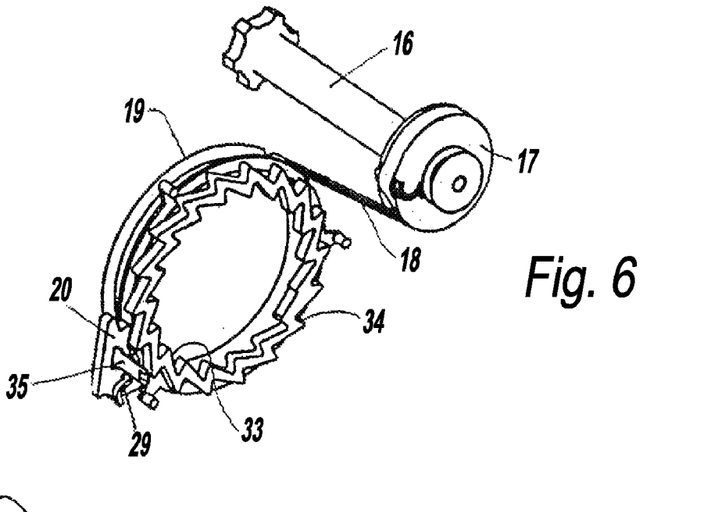
Figure 7:
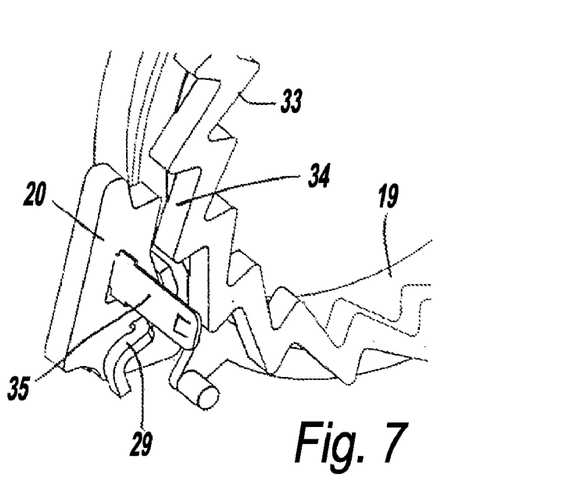
Figure 8:
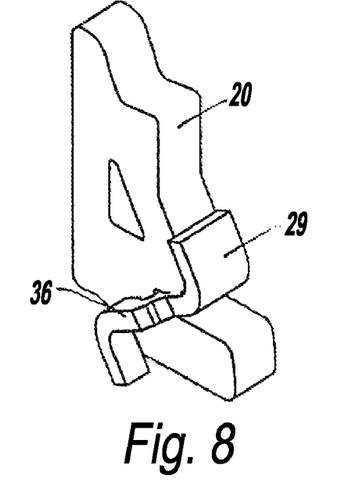
Figure 9:
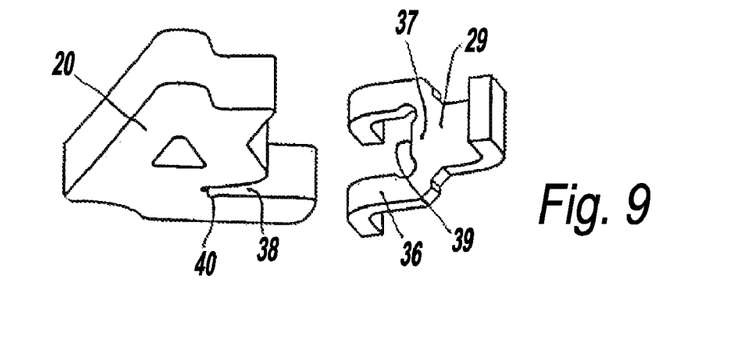

The interaction of the toothed ring 19 with the outer torsion rod 16 via the metal band 18 is apparent in detail from FIG. 6, and the engagement of the catch 20 mounted on the housing leg 12 in the outer gearing 34 of the toothed ring 19 is apparent in detail from FIGS. 7 to 9. In order to ensure the engagement of the catch 20 in the outer gearing 34 of the toothed ring 19 even when the toothed ring 19 is rotating, a separate control catch 29 is provided, which is configured as a U-shaped component with lateral legs 36 and an interposed connecting member 37, the catch 20 having a slotted mounting recess 38, in which the control catch 27 is inserted with the connecting member 37 thereof, so that the lateral legs 36 of the control catch 29 enclose the catch 20 between them. In this respect, the control catch 29 as such is mounted directly rotatably on the catch 20 allowing clearance for movement. This mounting is implemented such that a slightly protruding tilt edge 39 meshes with a receiving groove 40 at the bottom of the slotted mounting recess 38 of the catch 20, so that the control catch 29 may be displaced with minor expenditure of energy in the catch 20. A control cog 42 that is configured for the engagement into the outer gearing 34 of the toothed ring 19 is provided on the connecting member 37. A leaf spring 35 engages on the catch 20, by means of which in the resting position the catch 20 is kept disengaged from the outer gearing 34 of the toothed ring 33.

Figure 10A:
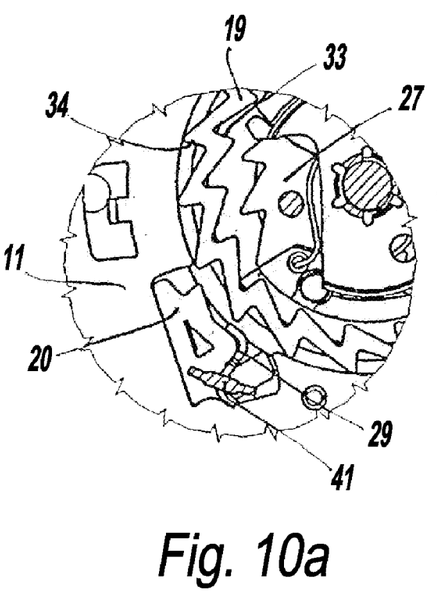
Figure 10B:
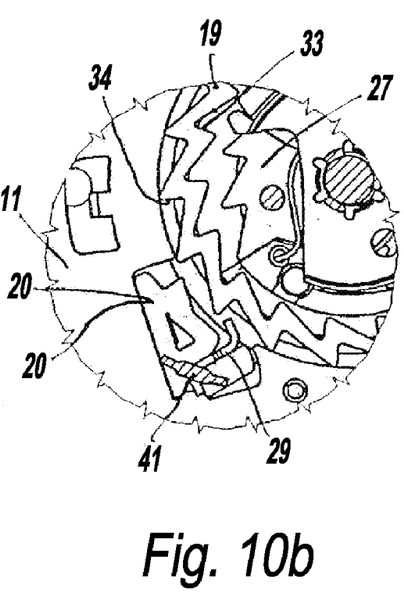
Figure 10C:
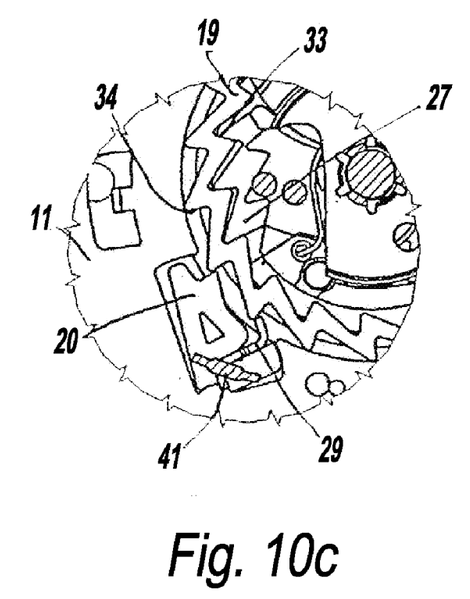

FIGS. 10a-10c show the implementation of the back and forth switching operation between the two levels of force limitation. As is apparent from FIG. 10a at first, the catch 20 is disengaged from the outer gearing 34 of the toothed ring 19; the same also applies to the control catch 29, which is maintained in the position illustrated in FIG. 10a by means of an extension 41 of the rocker arm 21 that engages on said control catch. In this position, the control catch 27 mounted on the profiled head 26 is also disengaged from the inner gearing 33 of the toothed ring 19. Thus, in this position of the involved components relative to one another, the belt shaft 13 can rotate freely. If, however, the control catch 27 engaged in the inner gearing of the toothed ring 23 is disengaged, the toothed ring 19 rotates together with the belt shaft in the direction of the belt extension, wherein the toothed ring 19 acts on the outer torsion rod 16 via the metal band 18 attached to the toothed ring, so that the low force limiting element becomes active on further rotation of the belt shaft.

FIG. 10b shows a position of the control catch 29, as implemented when switching the rocker arm 21 via the counter gear 22, wherein the extension 41 of the rocker arm 21 now engages the control catch 29 in the motion path of the outer gearing 34 of the toothed ring 19, so that the control catch 29 is grasped and pivoted when the rotation of the toothed ring 19 starts, wherein the pivoting of the control catch likewise pivots the catch 20 and definitely engages it in the outer gearing 34 of the toothed ring 19 and is entrained accordingly during engagement.

In the functional position shown in FIG. 10b, the control catch 27 has not been engaged in the inner gearing 33 of the toothed ring 19, so that the position according to FIG. 10b exemplifies the switching position in which, on activation of the locking system and engagement of the control catch 27, the toothed ring 19 is directly fixed in a force-transmitting manner on the housing leg 12 and/or housing 11 via the catch 20. Thus, in this position the second torsion rod that is disposed outside the belt shaft cannot become active with the low level of force limitation. When the catch 20 is engaged in the outer gearing 34 of the toothed ring 19, only the torsion rod 15 having the high level of force limitation disposed in the belt shaft 13 will in fact be engaged. In FIG. 10c, this state is shown in a certain intermediate position before the catch 20 is fully engaged in the outer gearing 34 of the toothed ring 19; consequently, the catch 20 is "ready for coupling".

Figure 11A:
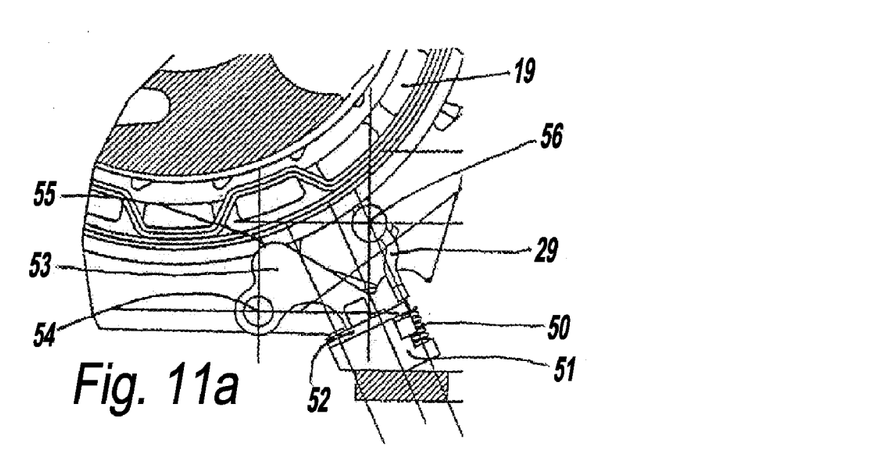
Figure 11B:
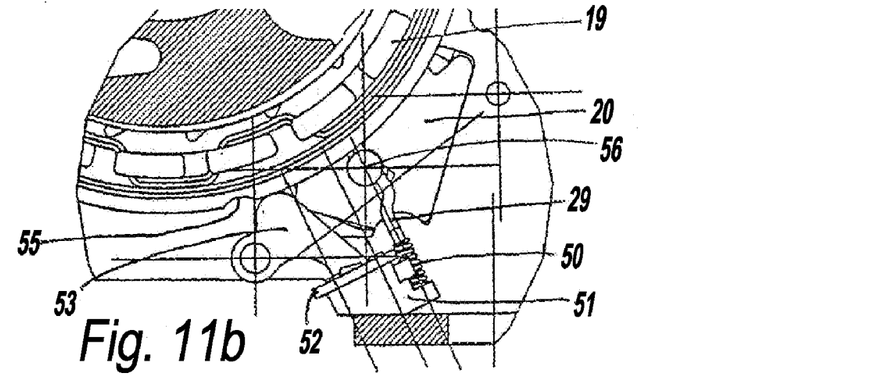
Figure 11C:
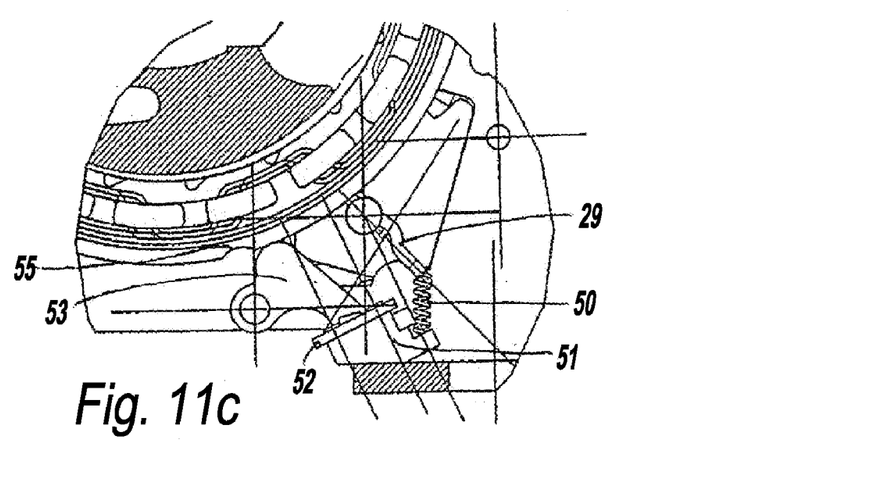

According to the exemplary embodiment shown in FIG. 11a-c, the arrangement of a pretensioned spring 50, which pretensions the control catch 29 in the direction of the engagement thereof in the outer gearing 34 of the toothed ring 19, ensures that when the control catch 29 is engaged in the gearing of the toothed ring 19, an additional switching force and/or additional torque is created. For this purpose, the end of the control catch 29 is tensioned by the pretensioned spring 50, which is supported oh a spring abutment 51 provided on the belt retractor housing 11. The pretensioned spring 50 is disposed and oriented with respect to the control catch 29 such that, in the release position of the control catch 29 for the toothed ring 19, the spring force line extends via the pivot bearing 56 of the control catch 29 on the catch 20 so that in this resting position of the control catch 29, the pretensioned spring 50 does not create additional torque that would have to be absorbed by the associated holding device. This holding device comprises a gate 52 that is guided displaceably on the spring abutment 51, wherein the gate fixes the pretensioned spring 50 in the initial position shown in FIG. 11a. The gate 52 in turn interacts with a holding lever 53 rotatably mounted about a pivot point 54, said holding lever being positively supported by means of a lever arm in a recess 55 that is configured on the toothed ring 19. Hence, in the position shown in FIG. 11a, the control catch 29 is held in the non-engaged position thereof with the outer gearing 34 of the toothed ring 19.

When an operational demand causes a rotation of the toothed ring 19 is started, this rotation of the toothed ring 19 causes the holding lever 53 to be released from the recess 55 of the toothed ring 19, pivoting as a result and displacing the gate 52 in the spring abutment 51 such that the pretensioned spring 50 is released, consequently acting upon the control catch 29. This functional position is shown in FIG. 11b.

When the position of the counter gear 22 is as described in FIG. 10b, the control catch 29 is engaged in the motion path of the outer gearing 34 of the toothed ring 19 and is grasped and pivoted with the onsetting rotation of the toothed ring 19. This engaging movement of the control catch 29, prompted by the pivoting of the control catch 29, is supported by the buckling pretensioned spring 50 that consequently exerts additional torque on the control catch 29. In this way, the switching operation is made irreversible because as a result of the action of the pretensioned spring 50 the control catch is also kept engaged in the outer gearing of the toothed ring, and the control catch 29 at the same time acts as a return stop for the toothed ring 19.

Figure 12:
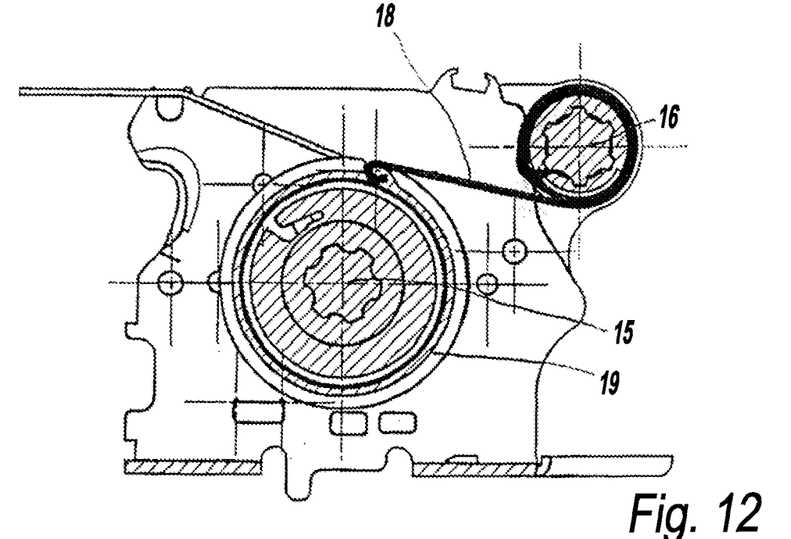
Figure 13:
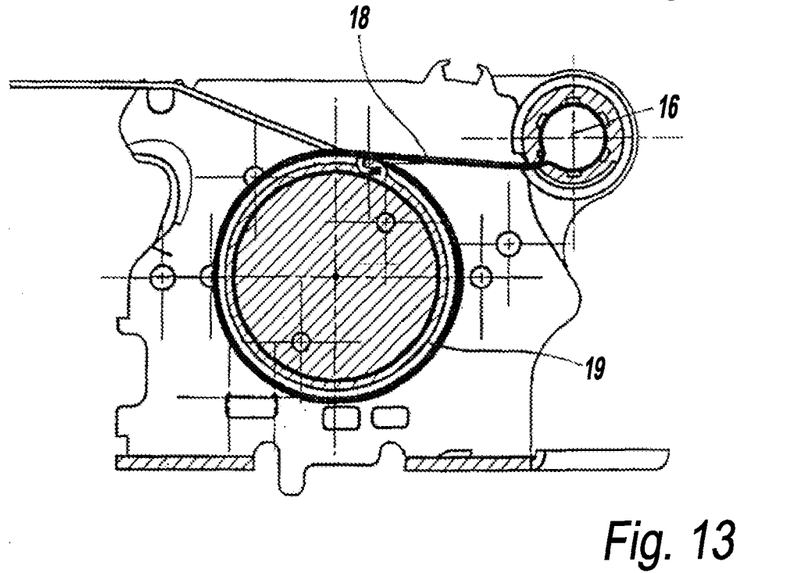

FIGS. 12 and 13 again show the connection of the second torsion rod 16, which is disposed outside the belt shaft 13, to the low level of force limitation and to the toothed ring 19 via the metal band 18. From FIG. 12 it is apparent that upon rotation of the toothed ring 19, the metal band 18 is unwound from the winding spool 17, which, due to the torque-proof connection thereof to the torsion rod 16, twists this torsion rod while absorbing a force. If, according to FIG. 13, the metal band 18 is fully unwound from the winding spool 17, a rigid system is created with respect to the force transmission via the rotatable toothed ring 19 as a result of the force-transmitting attachment of the metal band 18 to the torsion rod 16.

Figure 14:
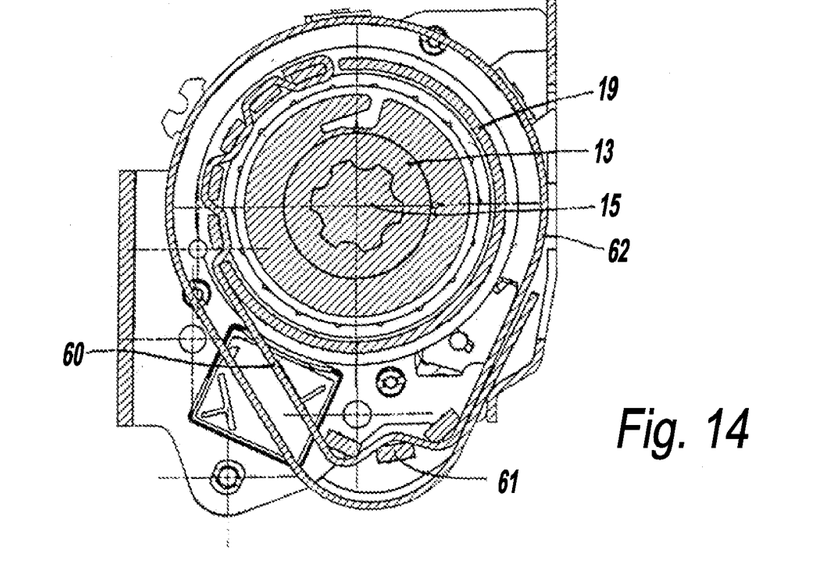
Figure 15:
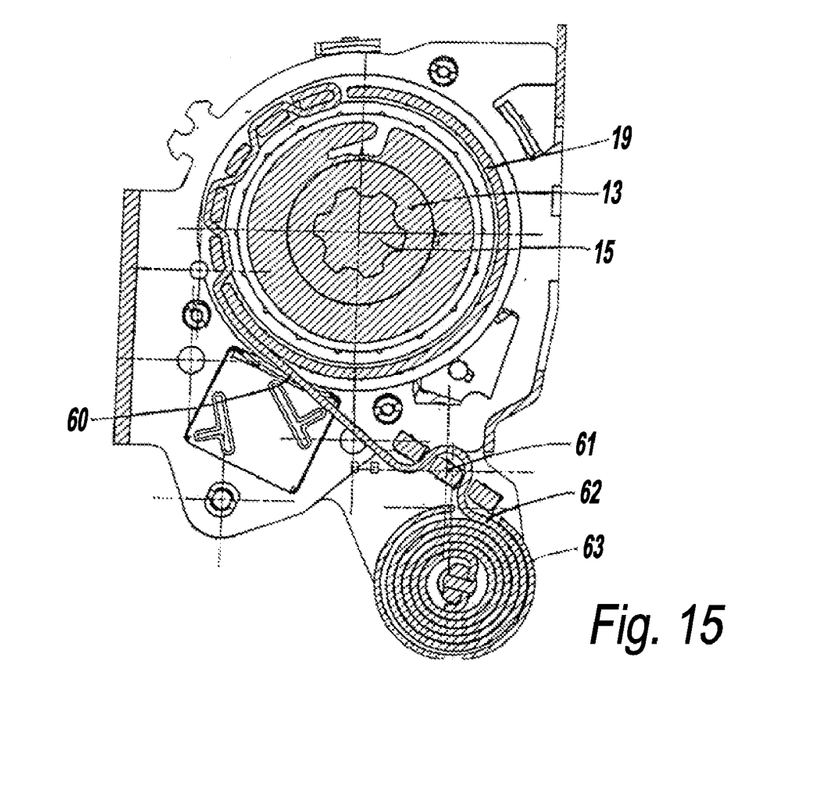

In another embodiment for the arrangement of a force limiting element having a lower level of force limitation shown in FIGS. 14 and 15, the function of the self-locking seat belt retractor is accomplished as described above. In the embodiment shown in FIGS. 14 and 15, the additional torsion rod having the lower level of force limitation is merely replaced by a bending brake. This bending brake comprises a pulling element 60, preferably in the form of a metal band made of a suitable material, which is attached with one end thereof to the toothed ring 19 and is guided by a baffle 61 that is fixed to the housing. With one free end 62, which forms a reserve for the pulling movement of the pulling element 60 through the baffle 61, the pulling element 60 protrudes the baffle 61. In the embodiment shown in FIG. 14, the free end 62 of the pulling element 60 is placed outside around the rotatable toothed ring 19 after the baffle 61 and is thus available as a reserve. In the exemplary embodiment shown in FIG. 15, this free end 62 is inserted in a separate reserve housing 63 that is disposed rotatably on the belt retractor housing 11 and may be extracted from there on rotation of the toothed ring 19.

The function of the belt retractor according to the present invention will again be explained with reference to the above-mentioned explanations of the functions of the individual components thereof.

If an occupant fastens the not illustrated seat belt webbing that is wound on the belt shaft 13 of the seat belt retractor 10 and thus extends it from the belt shaft 13, the counter gear 22 records the extent of the belt webbing extension, wherein the switching lug 30 located on the shaft gear wheel 23 meets with the switching lug 32a of the gear wheel 25 mounted on the rocker arm 21 after an appropriate number of revolutions of the belt shaft and switches the rocker arm 21 into a position illustrated in FIG. 10b upon reaching this switching point. Reaching the switching point during belt extension means that an accordingly large occupant has fastened the seat belt and needs the corresponding amount of belt webbing. In case of an accident, only the large force limiting level will apply to such a large occupant so that upon reaching the prescribed switching point, the control catch 29 is placed in the rotation path of the outer gearing 34 of the toothed ring 19. If during the accident the belt shaft 13 and toothed ring 19 are coupled by the engagement of the control catch 27 mounted on the profiled head 26 in the inner gearing 33 of the toothed ring 19, the toothed ring 19 actuates the control catch 29, which consequently engages the catch 20 in the outer gearing 34 of the toothed ring 19, so that the toothed ring is fixed to the housing 11. In this position, the second torsion rod 16 and/or the pulling element 60 having the low level of force limitation cannot become active. When the embodiment according to FIG. 11a-c is implemented, the dynamic engagement of the control catch 29 with the catch 20 in the outer gearing 34 of the toothed ring 19 is supported by the pretensioned spring 50.

If, on the other hand, a smaller occupant fastens the seat belt, the switching point between the switching lugs 30 and 32a activated by the corresponding belt extension will not be reached, so that the rocker arm 21 remains in a position, in which, according to FIG. 10a, it keeps the control clutch 29 disengaged from the outer gearing 34 of the toothed ring 19. In this position, upon coupling to the belt shaft 13, due to the disengagement of the control clutch 27 from the inner gearing 33 of the toothed ring 19 as a result of an accident, the toothed ring 19 may now rotate relative to the housing, unwinding the metal band 18 from the winding spool 17; the rotation of the winding spool 17 produces a force-absorbing twisting of the torsion rod 16. As the level of force limitation of the torsion rod 16 is lower than the level of force limitation of the torsion rod 15 of the belt shaft 13, only the low level of force limitation is active when the toothed ring 19 can be rotated, which is appropriate for a smaller occupant. This applies accordingly to the arrangement of the pulling element 60 as a force limiting element.

If upon buckling up an occupant has required such an amount of belt webbing that the corresponding switching point of the counter gear 22 has not been reached yet, it will first remain in the position described for FIG. 10b. However, as an occupant buckled up in such a way moves, bends forward, for example, more belt webbing is extended, and as this belt extension exceeds the correspondingly adjusted switching point between the switching lugs 30 and 32a, the rocker arm 21 will also be switched for this possibly short-term state, and in this respect a switching readiness in regard to switching only the torsion rod 15 is brought about. If in such a case the occupant straightens up again, the belt retraction associated with a back rotation of the belt shaft 13 causes the switching lug 32b of the gear wheel 25 disposed on the rocker arm 21 to meet with the switching lug 31 of the gear wheel 24 disposed on the bearing plate 28, and this results in a new switching motion of the rocker arm 21 into the position in which, according to FIG. 10a, the rocker arm 21 keeps the control catch 29 disengaged from the toothed ring 19 so that the toothed ring is in turn freely rotatable. This back and forth switching is perceivable to the buckled-up occupant; however, it ensures that, depending on the sitting position at the moment of the accident, either the low level of force limitation, or directly the high level of force limitation is also switched with smaller occupants in order to prevent excessive forward displacement of the occupant in the latter case.

A similar switching state is also possible if, in case of an accident, the belt release related to the second torsion rod 16 becoming active results in the switching point being exceeded, wherein an occupant who in the this case is first subject to the low level of force limitation gets too close to a vehicle part. In such a case as well, in particular as a result of the arrangement of the control catch 29, the catch 20 may be engaged in the rotating toothed ring 19, thus activating the high level of force limitation according to FIG. 10c.

The characteristics of the subject matter of the invention disclosed in the specification, claims, abstract and drawings can each be fundamental for the execution of the present invention in the different embodiments as such or in any combination thereof.

The invention claimed is:

1. A seat belt retractor for motor vehicles having a belt shaft and a housing, said retractor comprising:
a two-stage force limiting device having two force limiting elements connected in series, the force limiting elements being switchable between a high level and a low level of force limitation via an interposed coupling that is controlled by means of a control device for switching the coupling between the high level and the low level of force limitation, said control device comprising a counter gear mechanism which determines an amount of belt webbing that is extended from the belt shaft, the coupling being reversibly switchable between the high and the low levels of force limitation, the counter gear mechanism comprising a first externally toothed gear wheel rotatably connected to the belt shaft, a second externally toothed gear wheel rotatably connected to the housing, and a third externally toothed gear wheel rotatably connected to a rocker arm pivotably mounted on the housing and pivotable between two switching positions, wherein the third gear wheel meshes with the first and with the second toothed gear wheels, the first and third gear wheels comprising a first pair of interacting switching lugs, and the second and third gear comprising a second pair of interacting switching lugs, wherein the switching lugs of each pair come into contact with each other in a respective unwinding state and pivot the rocker arm into one of the two switching positions;
a first catch directly controlled by the rocker arm via a mechanical connection;
a second catch being a control catch positioned on the first catch relatively displaceably thereto and interacting with the rocker arm, the second catch having a control coq that interacts with an outer gearing of a toothed ring;
the first catch having a release position in which the first catch is pretensioned relative to the toothed ring by means of a first spring;
the second catch having a holding position and a release position and being biased by a pretensioned second spring in a direction of engagement in the outer gearing of the toothed ring, the second spring being fixed in the release position of the second catch relative to the toothed ring by means of a separately controlled holding device which releases the second spring when the second catch engages in the outer gearing of the toothed ring.

2. The seat belt retractor of claim 1 wherein the toothed ring is rotatably mounted on the housing of the belt retractor such that when locked can be engaged by a locking member of a profiled head, wherein the first catch that can be displaced back and forth between two switching positions by the control device, so that the first catch releases the toothed ring in the one switching position being the release position and locks it to the housing in the other switching position.

3. The seat belt retractor of claim 2 wherein the force limiting elements are disposed with respect to the toothed ring such that a first force limiting stage having a low level of force limitation is implemented by the toothed ring that can rotate in relation to the housing, and a second force limiting stage having the high level of force limitation is implemented by the first catch, which is controlled by the control device when engaged in the toothed ring.

4. The seat belt retractor of claim 3 wherein one of the force limiting elements defines the low level of force limitation and comprises a torsion rod positioned in the belt retractor housing outside of the belt shaft, one end of the rod being fixed inside the housing and the other end being attached to the toothed ring by means of a connecting means such that the revolution of the toothed ring can be translated into a twisting motion of the torsion rod.

5. The seat belt retractor of claim 4 wherein the connecting means comprises a metal band having a predetermined length, one end of the band being attached to the toothed ring and the other end of the band being wound on and attached to a winding spool fixed to the torsion rod and rotatably disposed on the belt retractor housing.

6. The seat belt retractor of claim 3 wherein one of the force limiting elements defines the low level of force limitation and comprises a bending brake positioned on the belt retractor housing outside of the belt shaft, said brake comprising a pulling element, guidable through a baffle fixed to the housing and having a length and two ends, one of the ends being attached to the toothed ring such that revolution of the toothed ring can be translated by the baffle into an energy-absorbing pull-through of the pulling element.

7. The seat belt retractor of claim 6 wherein the other end of the pulling element is a free end disposed around the toothed ring to form a reserve.

8. The seat belt retractor of claim 6 wherein the other end of the pulling element is a free end disposed in a storage housing rotatably mounted on the belt retractor housing, and is configured to be pulled out of the storage housing.

9. The seat belt retractor of claim 8 wherein the pulling element has a width that remains the same across its entire length.

10. The seat belt retractor of claim 8 wherein the pulling element has a width that varies across the length of the pulling element as a function of a change in the level of force limitation.

11. The seat belt retractor of claim 1 wherein the first gear wheel and the second gear wheel each comprise one of the switching lugs and the third gear wheel comprises two of the switching lugs to restrict a switching hysteresis.

12. The seat belt retractor of claim 1 wherein the second catch is U-shaped and the first catch comprises a slotted mounting recess for a the second catch, a connecting member thereof being inserted in the mounting recess while maintaining clearance for movement.

13. The seat belt retractor of claim 1 wherein the holding device comprises a gate that is displaceable relative to the second spring between an engaged position and an unengaged position.

14. The seat belt retractor of claim 13 wherein the holding position of the gate is maintained by a holding lever, which rests positively in a recess formed on the toothed ring and is released from the toothed ring when the toothed ring is rotated.

15. The seat belt retractor of claim 14 wherein the second spring is disposed and oriented such that the line of force of the spring force in the release position of the control catch of the toothed ring extends via a pivot bearing of the second catch on the first catch and, when the second catch is pivoted, buckles and produces a torque in the engagement direction of the second catch in the toothed ring.

* * * * *

UNITED STATES PATENT AND TRADEMARK OFFICE
CERTIFICATE OF CORRECTION

PATENT NO. : 8,123,154 B2  
APPLICATION NO. : 12/097412  
DATED : February 28, 2012  
INVENTOR(S) : Klaus-Peter Singer Page 1 of 1

It is certified that error appears in the above-identified patent and that said Letters Patent is hereby corrected as shown below:

Column 11:  
In claim 1, line 41, delete "coq" and insert --cog--.

Column 12:  
In claim 12, line 47, after "for" delete "a".

Signed and Sealed this  
Seventeenth Day of April, 2012

David J. Kappos  
*Director of the United States Patent and Trademark Office*